US010551961B2

United States Patent
Taby et al.

(10) Patent No.: US 10,551,961 B2
(45) Date of Patent: Feb. 4, 2020

(54) TOUCH GESTURE OFFSET

(71) Applicant: Facebook, Inc., Menlo Park, CA (US)

(72) Inventors: Majd Taby, San Francisco, CA (US); Henry Bridge, Brooklyn, NY (US); Jasper Reid Hauser, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 49 days.

(21) Appl. No.: 15/639,368

(22) Filed: Jun. 30, 2017

(65) Prior Publication Data

US 2017/0308229 A1 Oct. 26, 2017

Related U.S. Application Data

(63) Continuation of application No. 14/931,016, filed on Nov. 3, 2015, now Pat. No. 9,753,574, which is a
(Continued)

(51) Int. Cl.
*G09G 1/00* (2006.01)
*G06F 3/041* (2006.01)
*G06F 3/0488* (2013.01)
*G06F 3/0481* (2013.01)
*G06F 3/01* (2006.01)

(52) U.S. Cl.
CPC ............ *G06F 3/0416* (2013.01); *G06F 3/017* (2013.01); *G06F 3/041* (2013.01); *G06F 3/0418* (2013.01); *G06F 3/0481* (2013.01); *G06F 3/0488* (2013.01); *G06F 2203/04104* (2013.01)

(58) Field of Classification Search
CPC ............ G06F 3/041; G06F 3/01; G06F 3/033
See application file for complete search history.

(56) References Cited

U.S. PATENT DOCUMENTS

| 6,249,606 B1 | 6/2001 | Kiraly |
| 2008/0231608 A1 | 9/2008 | Nagata |

(Continued)

FOREIGN PATENT DOCUMENTS

| EP | 2 211 256 A1 | 7/2010 |
| WO | 2012/019350 A1 | 2/2012 |

(Continued)

OTHER PUBLICATIONS

Australian Government, IP Australia, Examination Report No. 2 for Application No. 2016238937, dated Dec. 20, 2017.
(Continued)

*Primary Examiner* — Michael A Faragalla
(74) *Attorney, Agent, or Firm* — Baker Botts L.L.P.

(57) ABSTRACT

In one embodiment, logic embodied in a computer-readable non-transitory storage medium of a device determines a location of a touch gesture by a user within a touch-sensitive area of the device. The logic selects for the touch gesture based on its location within the touch-sensitive area one of a plurality of pre-determined offsets, the pre-determined offsets being specific to the device, the pre-determined offsets being derived from device-specific empirical data on usage of the device by a plurality of users, and the pre-determined offsets being pre-loaded onto the device. The logic applies the pre-determined offset to the location of the touch gesture to determine a touch input intended by the user.

20 Claims, 6 Drawing Sheets

Related U.S. Application Data continuation of application No. 13/562,031, filed on Jul. 30, 2012, now Pat. No. 9,223,423.

(56) References Cited

U.S. PATENT DOCUMENTS

| | | |
|---|---|---|
| 2010/0013676 A1 | 1/2010 | Do |
| 2010/0188371 A1* | 7/2010 | Lowles ................ G06F 3/0418 345/178 |
| 2011/0102334 A1 | 5/2011 | Colley |
| 2012/0032891 A1 | 2/2012 | Parivar |

FOREIGN PATENT DOCUMENTS

| | | | | |
|---|---|---|---|---|
| WO | WO 2012019350 | * | 2/2012 | ............. G06F 3/033 |
| WO | WO 2012019350 A1 | | 2/2012 | |

OTHER PUBLICATIONS

State of Israel, Ministry of Justice, Notification of defects in Israeli Patent Application No. 253544 (with English translation), dated Dec. 26, 2017.
Australian Government, IP Australia, Examination Report No. 1 for Application No. 2016238937, dated Oct. 4, 2017.
Korean Intellectual Property Office, Notice of Preliminary Rejection, Patent Application No. 10-2017-7001144 (with English translation), dated Jun. 19, 2018.
European Patent Office, Communication pursuant to Article 94(3) EPC, Patent Application No. 13 177 341.8-1972, dated Sep. 6, 2017.
EP Communication received from EPO for Patent Application No. 13177341.8-1216, dated Jan. 7, 2019.
Notification of Defects for IL Patent Application No. 253544 (with English translation) dated Mar. 12, 2019.
EESR received from EPO for EP Patent Application No. 19178685.4-1216, dated Sep. 24, 2019.
AU Office Action received for Patent Application No. 2018241124, dated Sep. 20, 2019.

* cited by examiner

TOUCH GESTURE OFFSET

PRIORITY

This application is a continuation under 35 U.S.C. § 120 of U.S. patent application Ser. No. 14/931,016, filed 3 Nov. 2015, which is a continuation of U.S. patent application Ser. No. 13/562,031, filed 30 Jul. 2012, now U.S. Pat. No. 9,223,423 B2, issued on 29 Dec. 2015, which are incorporated herein by reference in their entirety.

TECHNICAL FIELD

This disclosure generally relates to touch-sensitive devices.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

Several different types of touch sensors exist, such as, for example, resistive touch screens, surface acoustic wave touch screens, and capacitive touch screens. Herein, reference to a touch sensor may encompass a touch screen, and vice versa, where appropriate. For a capacitive touch screen, a change in capacitance may occur within the touch screen at the location of an object's contact with or proximity to the surface of the capacitive touch screen. A touch-sensor controller may process the change in capacitance to determine the location (e.g. the coordinates) of the change in capacitance on the touch screen.

DESCRIPTION OF EXAMPLE EMBODIMENTS

Figures 1A, 1B:
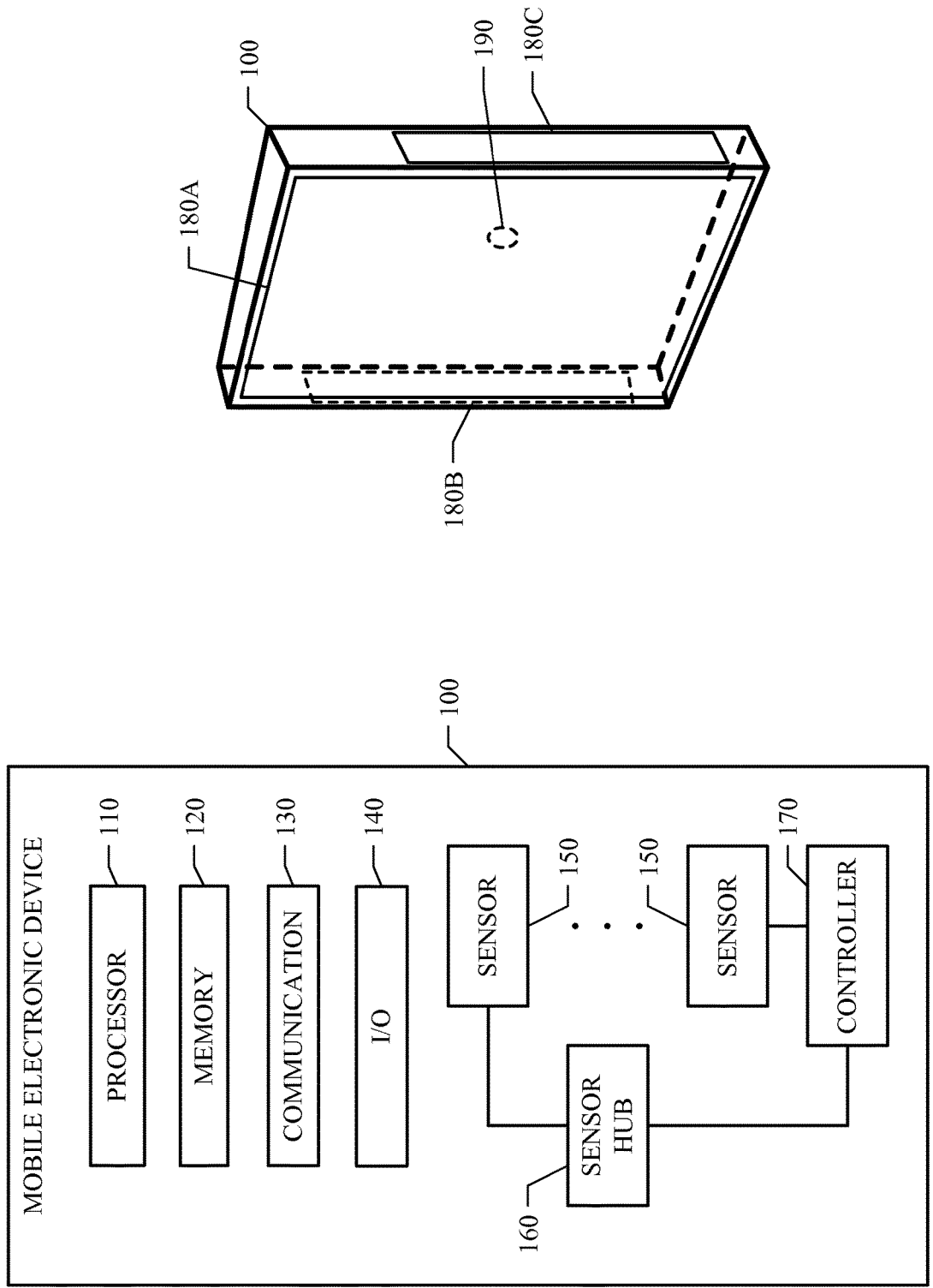
FIGS. 1A-B illustrate an example personal computing device.

FIG. 1A illustrates an example personal computing device 100. In particular embodiments, personal computing device 100 may comprise a processor 110, a memory 120, a communication component 130 (e.g., antenna and communication interface for wireless communications), one or more input and/or output (I/O) components and/or interfaces 140, and one or more sensors 150. In particular embodiments, one or more I/O components and/or interfaces 140 may incorporate one or more sensors 150. In particular embodiments, personal computing device 100 may comprise a computer system or and element thereof as described in FIG. 6 and associated description.

In particular embodiments, a personal computing device, such as a mobile device, may include various types of sensors 150, such as, for example and without limitation: touch sensors (disposed, for example, on a display of the device, the back of the device and/or one or more lateral edges of the device) for detecting a user touching the surface of the mobile electronic device (e.g., using one or more fingers); accelerometer for detecting whether the personal computing device 100 is moving and the speed of the movement; thermometer for measuring the temperature change near the personal computing device 100; proximity sensor for detecting the proximity of the personal computing device 100 to another object (e.g., a hand, desk, or other object); light sensor for measuring the ambient light around the personal computing device 100; imaging sensor (e.g., camera) for capturing digital still images and/or video of objects near the personal computing device 100 (e.g., scenes, people, bar codes, QR codes, etc.); location sensors (e.g., Global Positioning System (GPS)) for determining the location (e.g., in terms of latitude and longitude) of the mobile electronic device; sensors for detecting communication networks within close proximity (e.g., near field communication (NFC), Bluetooth, RFID, infrared); chemical sensors; biometric sensors for biometrics-based (e.g., fingerprint, palm vein pattern, hand geometry, iris/retina, DNA, face, voice, olfactory, sweat) authentication of user of personal computing device 100; etc. This disclosure contemplates that a mobile electronic device may include any applicable type of sensor. Sensors may provide various types of sensor data, which may be analyzed to determine the user's intention with respect to the mobile electronic device at a given time.

In particular embodiments, a sensors hub 160 may optionally be included in personal computing device 100. Sensors 150 may be connected to sensors hub 160, which may be a low power-consuming processor that controls sensors 150, manages power for sensors 150, processes sensor inputs, aggregates sensor data, and performs certain sensor functions. In addition, in particular embodiments, some types of sensors 150 may be connected to a controller 170. In this case, sensors hub 160 may be connected to controller 170, which in turn is connected to sensor 150. Alternatively, in particular embodiments, there may be a sensor monitor in place of sensors hub 160 for managing sensors 150.

In particular embodiments, in addition to the front side, personal computing device 100 may have one or more sensors for performing biometric identification. Such sensors may be positioned on any surface of personal computing device 100. In example embodiments, as the user's hand touches personal computing device 100 to grab hold of it, the touch sensors may capture the user's fingerprints or palm vein pattern. In example embodiments, while a user is viewing the screen of personal computing device 100, a camera may capture an image of the user's face to perform facial recognition. In example embodiments, while a user is viewing the screen of personal computing device 100, an infrared scanner may scan the user's iris and/or retina. In example embodiments, while a user is in contact or close proximity with personal computing device 100, chemical and/or olfactory sensors may capture relevant data about a user. In particular embodiments, upon detecting that there is a change in state with respect to the identity of the user utilizing personal computing device 100, either by itself or in combination with other types of sensor indications, personal computing device 100 may determine that it is being shared.

In particular embodiments, in addition to the front side, the personal computing device 100 may have touch sensors on the left and right sides. Optionally, the personal computing device 100 may also have touch sensors on the back, top, or bottom side. Thus, as the user's hand touches personal computing device 100 to grab hold of it, the touch sensors may detect the user's fingers or palm touching personal computing device 100. In particular embodiments, upon detecting that there is a change in state with respect to a user touching personal computing device 100, either by itself or in combination with other types of sensor indications, personal computing device 100 may determine that it is being shared.

In particular embodiments, personal computing device 100 may have an accelerometer in addition to or instead of the touch sensors on the left and right sides. Sensor data provided by the accelerometer may also be used to estimate whether a new user has picked up personal computing device 100 from a resting position, e.g., on a table or desk, display shelf, or from someone's hand or from within someone's bag. When the user picks up personal computing device 100 and brings it in front of the user's face, there may be a relatively sudden increase in the movement speed of personal computing device 100. This change in the device's movement speed may be detected based on the sensor data supplied by the accelerometer. In particular embodiments, upon detecting that there is a significant increase in the speed of the device's movement, either by itself or in combination with other types of sensor indications, personal computing device 100 may determine that it is being shared.

In particular embodiments, personal computing device 100 may have a Gyrometer in addition or instead of the touch sensors on the left and right sides. A Gyrometer, also known as a gyroscope, is a device for measuring the orientation along one or more axis. In particular embodiments, a Gyrometer may be used to measure the orientation of personal computing device 100. When personal computing device 100 is stored on a shelf or in the user's bag, it may stay mostly in one orientation. However, when the user grabs hold of personal computing device 100 and lifts it up and/or moves it closer to bring it in front of the user's face, there may be a relatively sudden change in the orientation of personal computing device 100. The orientation of personal computing device 100 may be detected and measured by the Gyrometer. If the orientation of personal computing device 100 has changed significantly, In particular embodiments, upon detecting that there is a significant change in the orientation of personal computing device 100, either by itself or in combination with other types of sensor indications, personal computing device 100 may determine that it is being shared.

In particular embodiments, personal computing device 100 may have a light sensor. When personal computing device 100 is stored in a user's pocket or case, it is relatively dark around personal computing device 100. On the other hand, when the user brings personal computing device 100 out of his pocket, it may be relatively bright around personal computing device 100, especially during day time or in well-lit areas. The sensor data supplied by the light sensor may be analyzed to detect when a significant change in the ambient light level around personal computing device 100 occurs. In particular embodiments, upon detecting that there is a significant increase in the ambient light level around personal computing device 100, either by itself or in combination with other types of sensor indications, personal computing device 100 may determine that it is being shared.

In particular embodiments, personal computing device 100 may have a proximity sensor. The sensor data supplied by the proximity sensor may be analyzed to detect when personal computing device 100 is in close proximity to a specific object, such as the user's hand. For example, mobile device 100 may have an infrared LED (light-emitting diode) 190 (i.e., proximity sensor) placed on its back side. When the user holds such a mobile device in his hand, the palm of the user's hand may cover infrared LED 190. As a result, infrared LED 190 may detect when the user's hand is in close proximity to mobile device 100. In particular embodiments, upon detecting that personal computing device 100 is in close proximity to the user's hand, either by itself or in combination with other types of sensor indications, personal computing device 100 may determine that it is being shared.

A personal computing device 100 may have any number of sensors of various types, and these sensors may supply different types of sensor data. Different combinations of the individual types of sensor data may be used together to detect and estimate a user's current intention with respect to personal computing device 100 (e.g., whether the user really means to take personal computing device 100 out of his pocket and use it). Sometimes, using multiple types of sensor data in combination may yield a more accurate, and thus better, estimation of the user's intention with respect to personal computing device 100 at a given time than only using a single type of sensor data. Nevertheless, it is possible to estimate the user's intention using a single type of sensor data (e.g., touch-sensor data).

FIG. 1B illustrates the exterior of an example personal computing device 100. Personal computing device 100 has approximately six sides: front, back, top, bottom, left, and right. Touch sensors may be placed anywhere on any of the six sides of personal computing device 100. For example, in FIG. 1B, a touchscreen incorporating touch sensors 180A is placed on the front of personal computing device 100. The touchscreen may function as an input/output (I/O) component for personal computing device 100. In addition, touch sensors 180B and 180C are placed on the left and right sides of personal computing device 100, respectively. Touch sensors 180B and 180C may detect a user's hand touching the sides of personal computing device 100. In particular embodiments, touch sensors 180A, 180B, 180C may be implemented using resistive, capacitive, and/or inductive touch sensors. The electrodes of the touch sensors 180A, 180B, 180C may be arranged on a thin solid piece of material or a thin wire mesh. In the case of capacitive touch sensors, there may be two types of electrodes: transmitting and receiving. These electrodes may be connected to a controller (e.g., controller 170 illustrated in FIG. 1A), which may be a microchip designed to drive the transmitting electrodes with electrical pulses and measure the changes in capacitance from the receiving electrodes caused by a user's touches in order to detect the locations of the user touches.

Of course, personal computing device 100 is merely an example. In practice, a device may have any number of sides, and this disclosure contemplates devices with any number of sides. The touch sensors may be placed on any side of a device.

In particular embodiments, personal computing device 100 may have a proximity sensor 190 (e.g., an infrared LED) placed on its back side. Proximity sensor 190 may be able to supply sensor data for determining its proximity, and thus the proximity of personal computing device 100, to another object.

Figure 2:
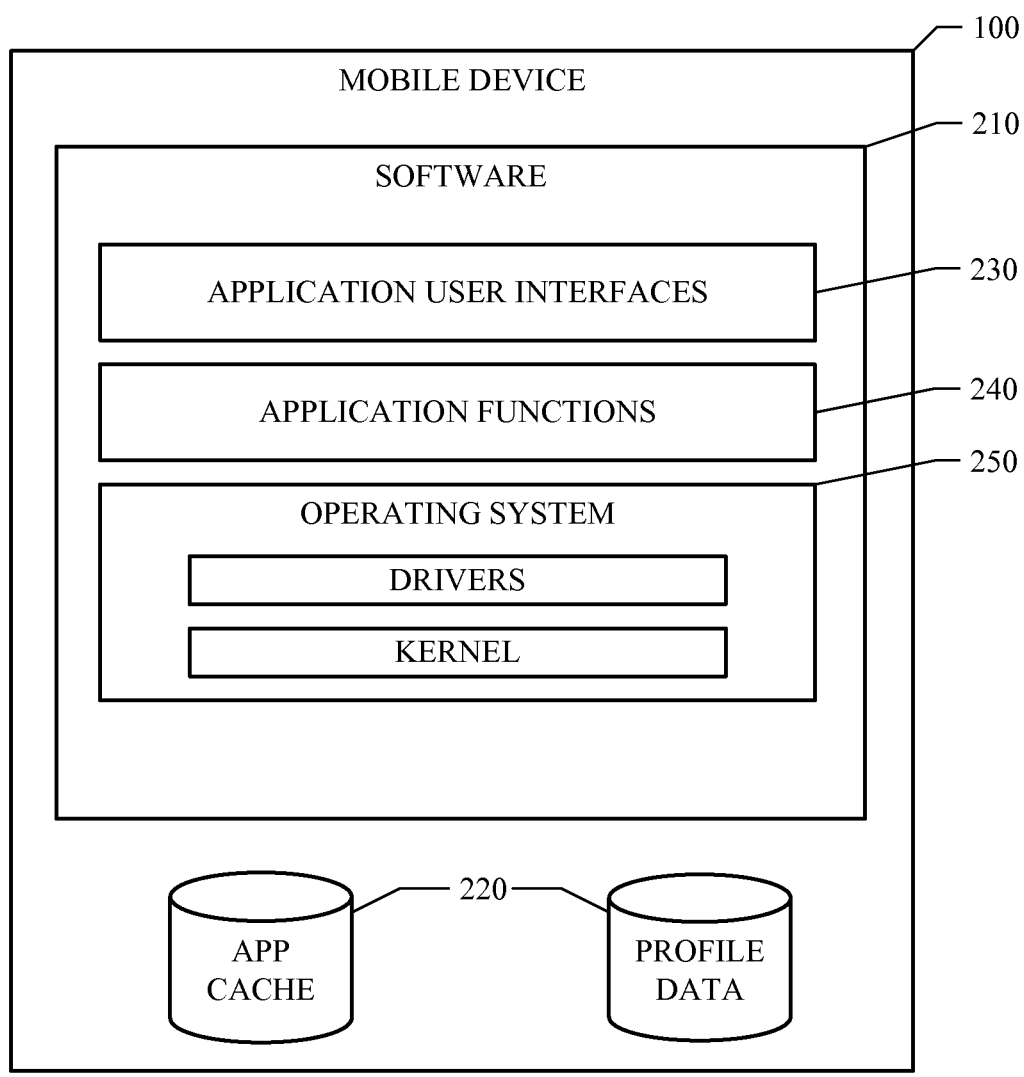
FIG. 2 illustrates an example software architecture for information and applications on a personal computing device.

FIG. 2 illustrates an example software architecture 200 for information and applications on a personal computing device 100. In particular embodiments, software architecture 200 may comprise software 210 and data store(s) 220. In particular embodiments, personal information may be stored in an application data cache 220 and/or a profile data store 220 and/or another data store 220. In particular embodiments, one or more software applications may be executed on personal computing device 100. In particular embodiments, they may be web-based applications hosted on servers. For example, a web-based application may be associated with a URI (Uniform Resource Identifier) or URL (Uniform Resource Locator). From personal computing device 100, a user may access the web-based application through its associated URI or URL (e.g., by using a web browser). Alternatively, in other embodiments, they may be native applications installed and residing on personal computing device 100. Thus, software 210 may also include any number of application user interfaces 230 and application functions 240. For example, one application (e.g., Google Maps®) may enable a device user to view a map, search for addresses and businesses, and get directions; a second application may enable the device user to read, send, and receive emails; a third application (e.g., a web browser) may enable the device user to browse and search the Internet; a fourth application may enable the device user to take photos or record videos using personal computing device 100; a fifth application may allow the device user to receive and initiate VoIP and/or cellular network calls, and so on. Each application has one or more specific functionalities, and the software (e.g., one or more software modules) implementing these functionalities may be included in application functions 240. Each application may also have a user interface that enables the device user to interact with the application, and the software implementing the application user interface may be included in application user interfaces 230. In particular embodiments, the functionalities of an application may be implemented using JavaScript®, Java®, C, or other suitable programming languages. In particular embodiments, the user interface of an application may be implemented using HyperText Markup Language (HTML), JavaScript®, Java®, or other suitable programming languages.

During the execution of an application, the device user may interact with the application through its user interface. For example, the user may provide inputs to the application in various displays (e.g., web pages). Outputs of the application may be presented to the user in various displays (e.g., web pages) as well. In particular embodiments, when the user provides an input to the application through a specific display (e.g., a specific web page), an event (e.g., an input event) may be generated by, for example, one or more application user interfaces 230. Each input event may be forwarded to application functions 240, or application functions 240 may listen for input events thus generated. When application functions 240 receive an input event, the appropriate software module in application functions 240 may be invoked to process the event. In addition, specific functionalities provided by operating system 250 and/or hardware (e.g., as described in FIGS. 1A-B) may also be invoked. For example, if the event is generated as a result of the user pushing a button to take a photo with personal computing device 100, a corresponding image processing module may be invoked to convert the raw image data into an image file (e.g., JPG or GIF) and store the image file in the storage 220 of personal computing device 100. As anther example, if the event is generated as a result of the user selecting an icon to compose an instant message, the corresponding short message service (SMS) module may be invoked to enable the user to compose and send the message.

In particular embodiments, when an output of the application is ready to be presented to the user, an event (e.g., an output event) may be generated by, for example, a software module in application functions 240 or operating system 250. Each output event may be forwarded to application user interfaces 230, or application user interfaces 230 may listen for output events thus generated. The user interface of an application may be implemented using a suitable programming language (e.g., HTML, JavaScript®, or Java®).

In particular embodiments, a touch-sensitive device may detect contact with a touch-sensitive area of the device. The contact may include one or more touch gestures by which a user interacts with a device or content, applications, etc. hosted on or executed by the device. Touch gestures include any suitable contact or sequences of contact, for example and not by way of limitation tapping the touch-sensitive area with one or more fingers, pressing on the touch-sensitive area with one or more fingers, swiping one or more fingers across the touch-sensitive area, separating or bringing together two or more fingers on the touch-sensitive area, or any suitable combination thereof.

Software, hardware, or both in the touch-sensitive device may detect where a touch gesture occurred on the touch-sensitive area of a device. As an example and not by way of limitation, a capacitive touch screen may detect a change in charge, capacitance, voltage, current, or any suitable electromagnetic signal at the one or more locations where the touch gesture is performed. These electronic signals may be transduced, processed, or modified using any suitable combination of hardware or software into any suitable electromagnetic signals and detected by, stored in, or modified by any suitable hardware such as one or more processors 110 in FIG. 1A, sensors 150, memory 120, software executed by any of these elements, or any suitable combination thereof. As used in herein, detecting the one or more signals relating to or created by a touch gesture may also include resolving the detected signal into a location on the touch-sensitive area where the touch gesture occurred. The location may be resolved into or expressed by any suitable metric, such as polar or Cartesian coordinates, and may be measured in relation to any suitable fixed or relative reference point. While this disclosure provides specific examples of the form of signals detected, the processing that occurs on the detected signals, the format expressing a location of a touch gesture on a touch-sensitive area, and the hardware or software that performs these functions, this application contemplates any suitable method of or hardware or software capable of detecting a touch gesture on a touch-sensitive area, processing or storing the detected signals, and resolving a location on the touch-sensitive area defining where the touch-sensitive gesture occurred.

Figure 3:
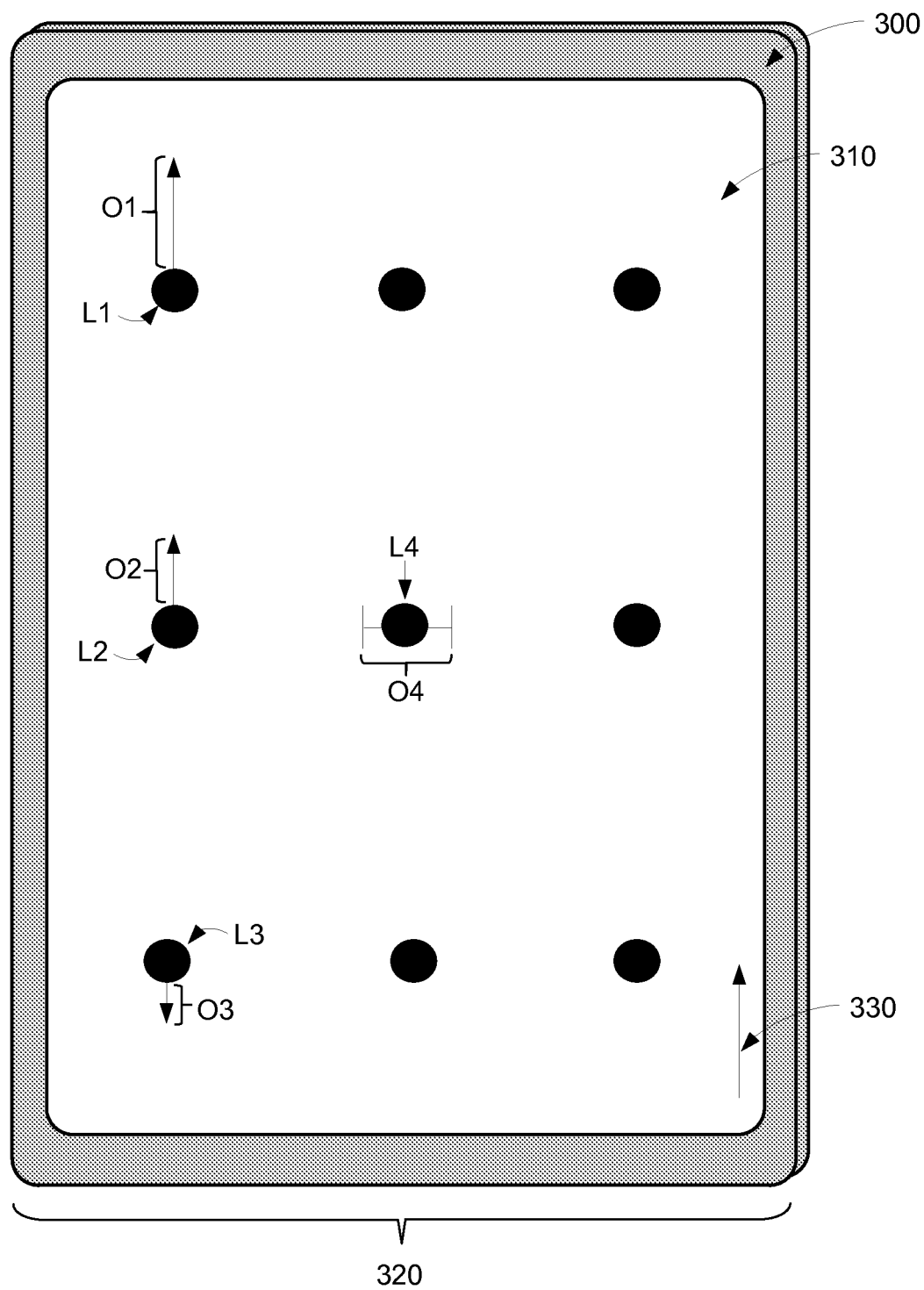
FIG. 3 illustrates example offsets applied to touch gestures on a touch-sensitive device.
Figure 4:
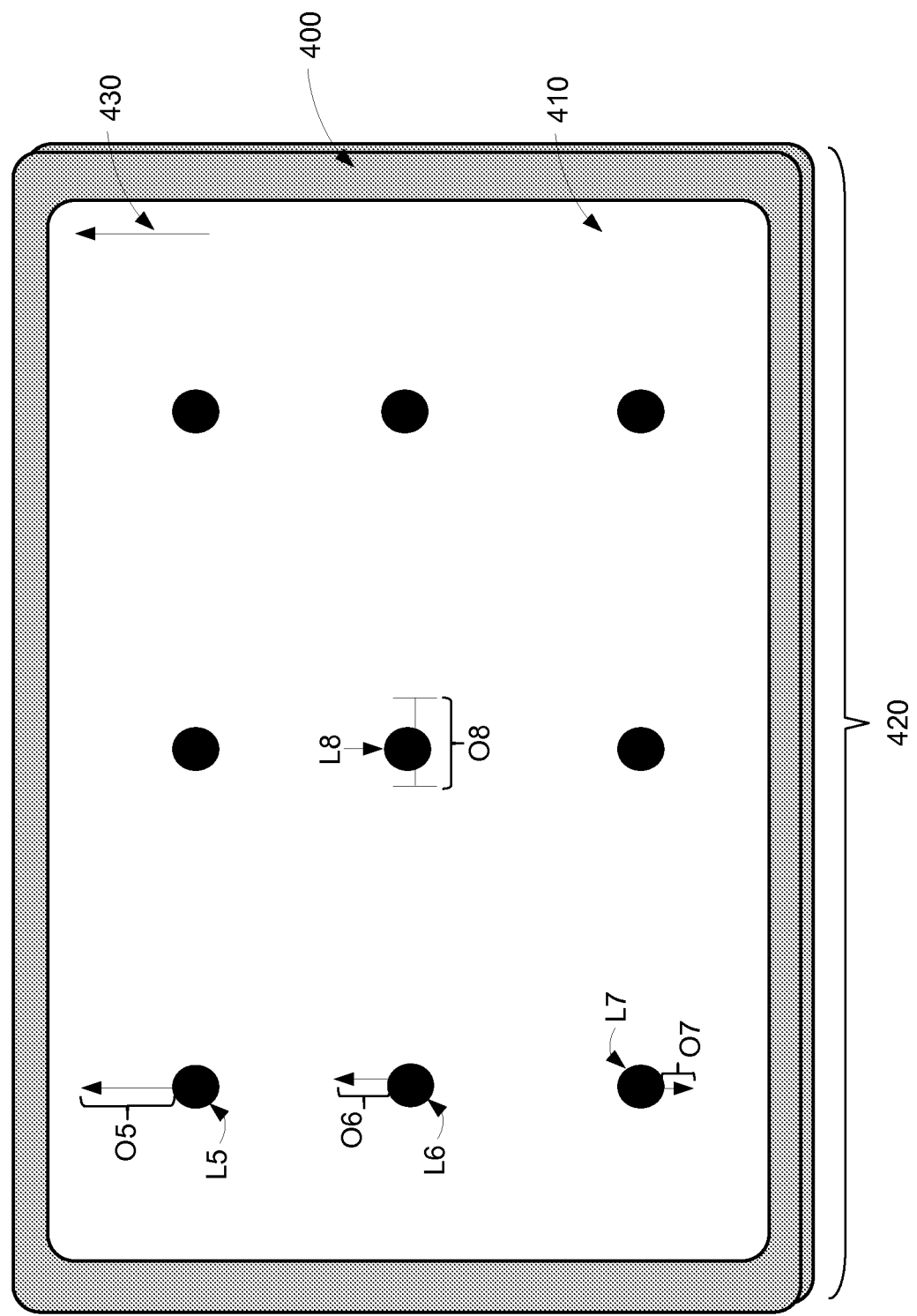
FIG. 4 illustrates example offsets applied to touch gestures on a touch-sensitive device.

In particular embodiments, one or more offsets may be applied to the resolved location of a touch gesture performed on a touch-sensitive area. Offsets may be applied to the resolved location in any suitable dimension (which includes any suitable direction(s) corresponding to the dimension(s)) or may offset the resolved location in any suitable amount. The amount and dimension of an offsets may be constant or may be a function of any suitable variables. As examples and not by way of limitation, the amount, dimension, or both of the applied offset may be a function of the hand the user is using to hold the device; the hand, the finger(s), or object(s) used to perform the touch gesture; the orientation of the device; the angle of the device relative to the user or any other suitable point; the proximity of the touch gesture to the user or another suitable pre-determined area; motion undergone by the device before, during, or after the touch gesture occurs; the particular user using the device; the physical characteristics of the device (e.g. the type of touch-sensitive technology used, the physical dimensions of the device or the touch-sensitive area, the hardware or software used to detect, process, and/or resolve touch gestures, etc.), or any suitable combination thereof. As an example, an offset to a touch gesture may depend on the distance the touch gesture occurs from a specified location or area of a device, such as the area of the device held by a user. In addition or the alternative, an offset may depend in part on the orientation of the device. These examples are illustrated in FIGS. 3-4. In the example of FIG. 3, device 300 determines that a touch gesture has been performed at a specific location on touch-sensitive area 310, for example location $L_1$. If the user is holding device 300 near edge 320 or the device is oriented such that arrow 330 appears vertically, the device may apply offsets that vary as a function of the distance of the location of the touch gesture from the edge 320 of the device. For example, a touch gesture performed at location $L_1$ may have a vertical offset $O_1$ applied to the touch gesture, while a touch gesture performed at location $L_3$ may have an offset $O_3$ applied to the touch gesture. As illustrated in FIG. 3, the amount of offsets $O_1$, $O_2$, and $O_3$ may increase as the touch gesture is farther away from edge 320 of the device. A horizontal offset $O_4$ may be applied to a touch gesture's location, such as $L_4$. Offsets $O_1$, $O_2$, $O_3$, and $O_4$ may be uniform for any location touched on touch-sensitive area 310, may vary as a function of the horizontal location touched, may vary as a function of the vertical location touched, or any suitable combination thereof.

FIG. 4 illustrates an example device 400 with touch-sensitive area 410. Example device 400 determines that a touch gesture has been performed at a specific location on touch-sensitive area 410, for example location $L_5$. If the user is holding device 400 near edge 420 or the device is oriented such that arrow 430 appears vertically, the device may apply offsets that vary as a function of the distance of the location of the touch gesture from the edge 420 of the device. For example, a touch gesture performed at location $L_5$ may have a vertical offset $O_5$ applied to the touch gesture, while a touch gesture performed at location $L_7$ may have an offset $O_7$ applied to the touch gesture. As illustrated in FIG. 4, the amount of offsets $O_5$, $O_6$, and $O_7$ may increase as the touch gesture is farther away from edge 420 of the device. A horizontal offset $O_8$ may be applied to a touch gesture's location, such as $L_8$. Offsets $O_5$, $O_6$, $O_7$, and $O_8$ may be uniform for any location touched on touch-sensitive area 410, may vary as a function of the horizontal location touched, may vary as a function of the vertical location touched, or any suitable combination thereof. In particular embodiments, offsets $O_5$, $O_6$, $O_7$ and $O_8$ may be different in amount or dimension or may depend on different variables than offsets $O_1$, $O_2$, $O_3$, and $O_4$ illustrated in FIG. 3. In particular embodiments, offsets $O_5$, $O_6$, $O_7$ and $O_8$ may depend on the same variables as offsets $O_1$, $O_2$, $O_3$, and $O_4$ illustrated in FIG. 3. In particular embodiments, offsets $O_4$ and $O_8$ may be identical. In particular embodiments, offsets $O_5$, $O_6$, $O_7$ and $O_8$ and offsets $O_1$, $O_2$, $O_3$, and $O_4$ illustrated in FIG. 3 may vary based on the finger(s) used to perform the touch gestures. For example, an offset may vary in amount or dimension when the touch gesture is performed with a thumb rather than an index finger. While this disclosure provides specific examples of the types of offsets applied and the variables that the amount or dimension of an offset may depend on, this disclosure contemplates any suitable types of offsets that depend on any suitable variables.

In particular embodiments, one or more offsets may be hard-coded on a device, such as in a permanent memory element or microcontroller logic of the device. In particular embodiments, hard-coded offsets may be applied to every instance of the touch gestures the offsets corresponds to. In particular embodiments, hard-coded offsets may be unalterable by the user, may be altered only by firmware updates to the device, or may be freely altered by a user. In particular embodiments, a device or software on the device may determine whether to apply one or more offsets to a touch gesture at the time or shortly after the touch gesture is performed. For example, whether to apply an offset to a touch gesture may depend on circumstances (such as any variable an offset may depend on, as described above) before, during, or shortly after the touch gesture is performed. Such offsets may be unalterable by the user, may be altered only by firmware updates to the device, or may be freely altered by a user. While this disclosure provides specific examples of when a device or software on the device determines to apply an offset to a corresponding touch gesture, this disclosure contemplates any suitable method of a device or software on the device determining when an offset is to be applied.

In particular embodiments, offsets may be stored in a memory element of a device or other suitable electronic storage media associated with the device. In particular embodiments, offsets may be stored on one or more servers accessible by the device. In particular embodiments, offsets may be pre-loaded onto a device prior to a user's initial use of the device. For example, offsets pre-loaded onto a device may relate to a device's physical characteristics, such as physical dimensions, weight, thickness, manufacturer, the quality of the device or specific components in the device, or the type of processors, sensors, microcontrollers, or components in the device. In particular embodiments, offsets may relate to the physical characteristics of a device as a whole. Offsets may be determined by testing the ability of one or more users of a device to perform a touch gesture at a specified location and gathering data on appropriate offsets to apply to the touch gesture. The data may be organized and processed by any suitable method, such as averaging the offsets to be applied over the entire group of test users or over sub-groups of users (e.g. by hand size). As an example and not by way of limitation, a test may involve tapping specified locations on a touch-sensitive area. The difference between the tapped location and the specified location may be stored as an offset for the tapping touch gesture. The device may use any suitable function or statistical method to extrapolate the appropriate offset to apply when the tapping gesture is performed on locations not explicitly tested during the testing period. The types of offset, the amount of offset, and the conditions defining when to apply an offset determined from the testing period may be loaded onto a device prior to a commercial user's initial user of the device. While this disclosure describes specific examples of different ways an offset may be determined and pre-loaded onto a device, this disclosure contemplates any suitable method of determining an offset and pre-loading it onto a device.

In particular embodiments, one or more offsets may be downloaded by a device or a user of the device. Continuing the example above, if further testing reveals additional offsets or refinements to existing offsets are appropriate, the device may automatically download the updated offsets or may prompt a user to download the updates. In particular embodiments, a user may upload or download one or more offsets corresponding to one or more touch gestures. For example, a user may download an offset that another user has created for a specific device or a specific application, such as a touch gesture in a particular game. In particular embodiments, a user may create or edit one or more offsets for use by a particular device, application, touch gesture, or during any suitable circumstance such as when the device is undergoing specific kinds or degrees of motion. The user may do so by specifying when the offset is to be applied and the amount and dimension of offset to be applied, including any variables the degree of offset should depend on. In particular embodiments, an offset may be created or an existing offset edited by a device capable of machine learning as a user uses the device. For example, a user may perform a touch gesture multiple times (e.g. by attempting to select an object displayed on a touch-sensitive area) before triggering the functionality intended by the touch gesture. The device may record the multiple attempts and create an offset that, when applied to the failed touch gestures, would result in the intended functionality. The device may record and analyze the type of touch gesture performed, the offset required to correct the touch gesture, the circumstances (such as motion of the device) accompanying the touch gestures, and any other suitable data to create or edit an offset based on the recorded information. In particular embodiments, offsets may be created or edited during a testing phase initiated by a user or device. For example and not by way of limitation, the user could choose to periodically initiate a test for all or a particular subset of touch gestures, and the results of the test may be used to create or edit offsets. As an example and not by way of limitation, the test may involve tapping specified locations on a touch-sensitive area. The difference between the tapped location and the specified location may be stored as an offset for the tapping touch gesture. The device may use any suitable function or statistical method to extrapolate the appropriate offset to apply when the tapping gesture is performed on locations not explicitly tested during the testing period. While the above disclosure describes specific examples of the ways a user or device may access, store, create, or edit offsets to touch gestures, this disclosure contemplates any suitable method of or hardware or software capable of accessing storing, creating, or editing offsets to touch gestures.

In particular embodiments, more than one offset may be available to or applied by a device for a particular touch gesture. As an example, a device may have one or more offsets pre-loaded onto the device prior to a user's initial use of the device. A user may also create one or more profiles containing offsets to be applied when that user uses the device. In particular embodiments, both types of offsets described above may be applied to a touch gesture. In particular embodiments, only one type of offsets may be applied to a touch gesture. While the example above describes simultaneously using two types of offsets or selecting between two types of offsets, this disclosure contemplates simultaneously using any suitable number of offsets or selecting any suitable combination of offsets to apply or ignore, In particular embodiments, a user may select the offsets or types of offsets they wish to apply indefinitely, for a particular duration or usage session, while using a particular application or set of applications, or to a particular touch gesture. As an example, a user may select user-created offsets to be applied only while the device is undergoing motion or a particular type of motion, only during a particular application such as a game, or only to a particular touch gesture such as a multi-finger swipe. In particular embodiments, a device may access the types of offsets to be applied to a touch gesture and select only those offsets that would be appropriate to apply to the touch gesture. For example, a particular user may have a set of offsets unique to that user activated. If the user allows a second user to use the device, and the second user signs into an application or accesses data that the device detects does not belong to the original user, the device may automatically deactivate the original user's offsets or query the current user whether they would like to deactivate the original user's offsets. The device may also activate a set of offsets related to the second user when it detects that the second user is using the device. While this disclosure describes specific examples of when and how a device or user may activate or deactivate various sets of offsets, this disclosure contemplates any suitable method of or hardware or software capable of activating or deactivating offsets.

Figure 5:
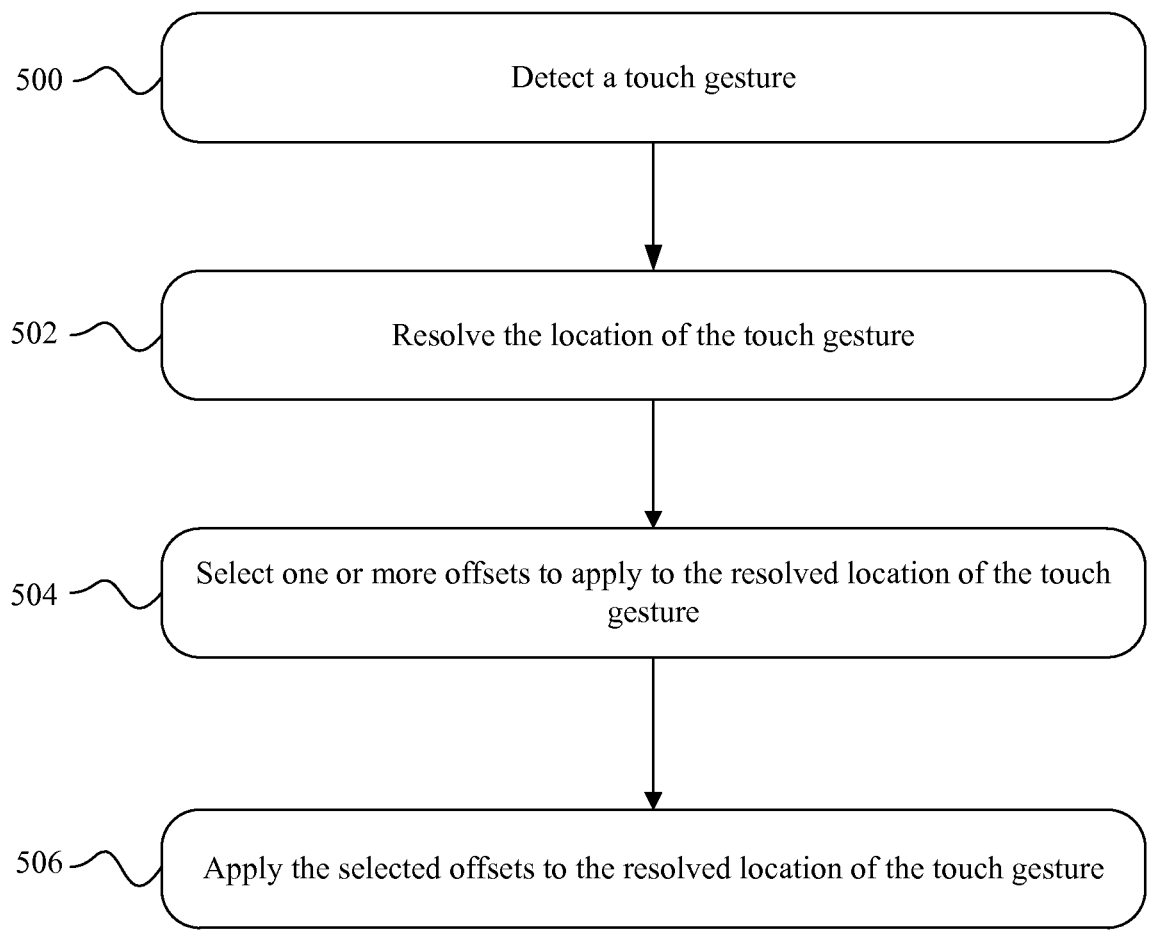
FIG. 5 illustrates an example method for applying offsets to the resolved location of a touch gesture.

FIG. 5 illustrates an example method for applying offsets to the resolved location of a touch gesture. The method may start at step 500, where a touch gesture performed on a touch-sensitive area of a device is detected. At step 502, one or more locations of the detected touch gesture is determined. At step 504, one or more offsets are selected to apply to the resolved location(s) of the touch gesture. At step 506, the selected offsets are applied to the resolved location(s) of the touch gesture, at which point the method may end. Particular embodiments may repeat the steps of the method of FIG. 5, where appropriate. Moreover, although this disclosure describes and illustrates particular steps of the method of FIG. 5 as occurring in a particular order, this disclosure contemplates any suitable steps of the method of FIG. 5 occurring in any suitable order. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
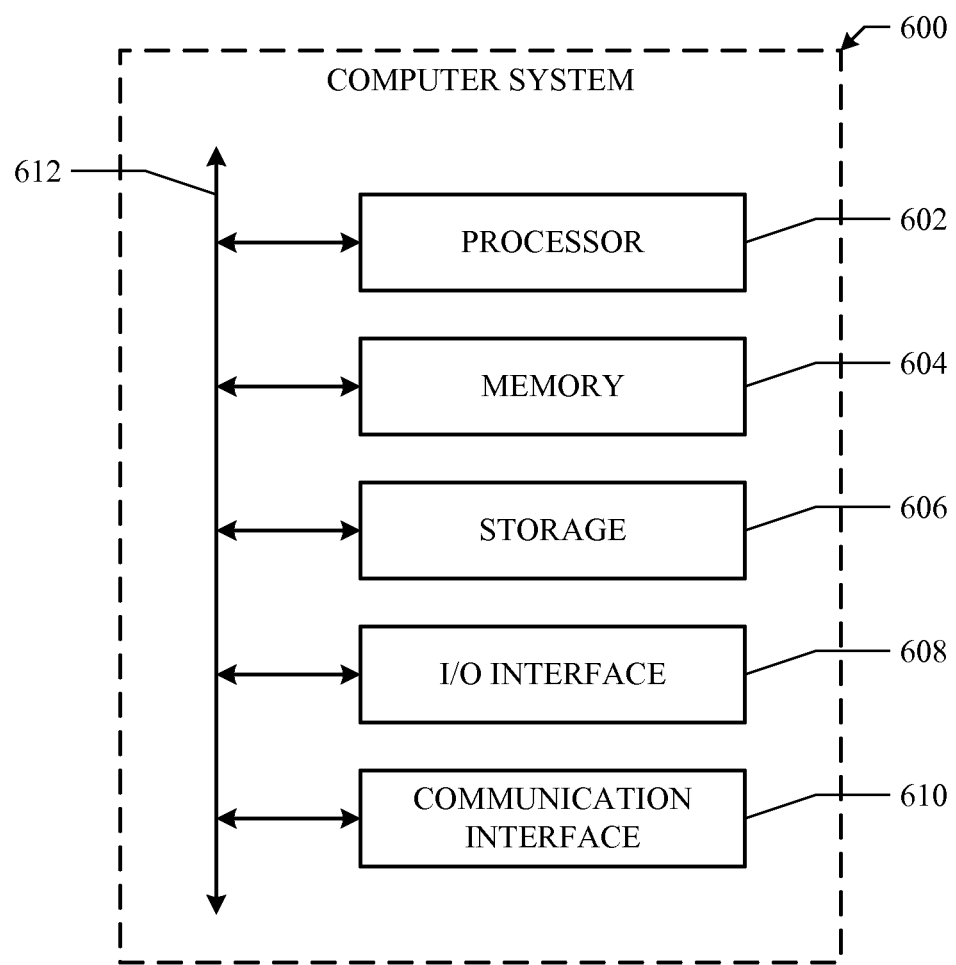
FIG. 6 illustrates an example computer system for performing particular embodiments.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple datacenters; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 02 to memory 604. Bus 612 may include one or more memory buses, as described below. In particular embodiments, one or more memory management units (MMUs) reside between processor 602 and memory 604 and facilitate accesses to memory 604 requested by processor 602. Although this disclosure describes and illustrates particular memory, this disclosure contemplates any suitable memory.

In particular embodiments, storage 606 includes mass storage for data or instructions. Storage 606 may include removable or non-removable (i.e., fixed) media, where appropriate. Storage 606 may be internal or external to computer system 600, where appropriate. In particular embodiments, storage 606 is non-volatile, solid-state memory. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 610 for it. Although this disclosure describes and illustrates a particular communication interface, this disclosure contemplates any suitable communication interface.

In particular embodiments, bus 612 includes hardware, software, or both coupling components of computer system 600 to each other. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both,"

unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by one or more processors associated with a device, downloading a selected one of a plurality of groups of offsets from a server based on a plurality of test gestures, wherein the test gestures assess the user's ability to perform a touch gesture at a specified location on a touch-sensitive area of the device;
   by the one or more processors, determining, out of a plurality of gestures performed on the touch-sensitive area of the device, one or more failed gestures performed by a user attempting to invoke a particular functionality wherein each failed gesture has one or more same conditions associated with its input, and wherein the one or more same conditions associated with each failed gesture comprises a detected motion of the device that accompanies the failed gesture;
   by the one or more processors, determining an offset for the one or more failed gestures that would have resulted in successful invocation of the particular functionality;
   by the one or more processors, adding the offset for the one or more failed gestures to the selected group of offsets on the server; and
   by the one or more processors, in response to detecting simultaneous occurrence of the one or more same conditions along with a new gesture that matches one of the one or more failed gestures, applying the offset to the new gesture to invoke the particular functionality.

2. The method of claim 1, wherein determining the one or more failed gestures further comprises determining a successful gesture in which the user successfully invokes the particular functionality.

3. The method of claim 1, wherein the one or more same conditions comprise a detected acceleration of the device.

4. The method of claim 1, wherein the plurality of gestures are recorded from the user's previous use of the device.

5. The method of claim 1, wherein determining the one or more failed gestures further comprises determining a set of gestures within a predetermined time period for which no functionality was invoked by the device.

6. The method of claim 5, wherein determining the one or more failed gestures further comprises identifying a successful gesture that invoked the particular functionality within a predetermined time period of the one or more failed gestures.

7. The method of claim 1, wherein each of the one or more failed gestures are associated with a respective feature vector, and the one or more same conditions are features of each feature vector.

8. The method of claim 7, wherein the respective feature vectors for the one or more failed gestures are used as training data to train a machine learning algorithm.

9. The method of claim 8, wherein the machine learning algorithm applies offsets to newly received touch gesture inputs to invoke the particular functionality.

10. The method of claim 1, wherein the offset corresponds to a location within the touch-sensitive area of the device.

11. One or more computer-readable non-transitory storage media embodying software that is operable when executed to:
    download a selected one of a plurality of groups of offsets from a server based on a plurality of test gestures, wherein the test gestures assess the user's ability to perform a touch gesture at a specified location on a touch-sensitive area of the device;
    determine, out of a plurality of gestures performed on the touch-sensitive area of the device, one or more failed gestures performed by a user attempting to invoke a particular functionality wherein each failed gesture has one or more same conditions associated with its input, and wherein the one or more same conditions associated with each failed gesture comprises a detected motion of the device that accompanies the failed gesture;
    determine an offset for the one or more failed gestures that would have resulted in successful invocation of the particular functionality;
    add the offset for the one or more failed gestures to the selected group of offsets on the server; and
    in response to detecting simultaneous occurrence of the one or more same conditions along with a new gesture that matches one of the one or more failed gestures, applying the offset to the new gesture to invoke the particular functionality.

12. The media of claim 11, wherein determining the one or more failed gestures further comprises determining a successful gesture in which the user successfully invokes the particular functionality.

13. The media of claim 11, wherein the one or more same conditions comprise a detected acceleration of the device.

14. The media of claim 11, wherein the plurality of gestures are recorded from the user's previous use of the device.

15. The media of claim 11, wherein determining the one or more failed gestures further comprises determining a set of gestures within a predetermined time period for which no functionality was invoked by the device.

16. The media of claim 15, wherein determining the one or more failed gestures further comprises identifying a successful gesture that invoked the particular functionality within a predetermined time period of the one or more failed gestures.

17. The media of claim 11, wherein each of the one or more failed gestures are associated with a respective feature vector, and the one or more same conditions are features of each feature vector.

18. The media of claim 17, wherein the respective feature vectors for the one or more failed gestures are used as training data to train a machine learning algorithm.

19. The media of claim 18, wherein the machine learning algorithm applies offsets to newly received touch gesture inputs to invoke the particular functionality.

20. A system comprising:
one or more processors; and
a memory coupled to the processors comprising instructions executable by the processors, the processors being operable when executing the instructions to:
   download a selected one of a plurality of groups of offsets from a server based on a plurality of test gestures, wherein the test gestures assess the user's ability to perform a touch gesture at a specified location on a touch-sensitive area of the device;
   determine, out of a plurality of gestures performed on the touch-sensitive area of the device, one or more failed gestures performed by a user attempting to invoke a particular functionality wherein each failed gesture has one or more same conditions associated with its input, and wherein the one or more same conditions associated with each failed gesture comprises a detected motion of the device that accompanies the failed gesture;
   determine an offset for the one or more failed gestures that would have resulted in successful invocation of the particular functionality;
   add the offset for the one or more failed gestures to the selected group of offsets on the server; and
   in response to detecting simultaneous occurrence of the one or more same conditions along with a new gesture that matches one of the one or more failed gestures, applying the offset to the new gesture to invoke the particular functionality.

* * * * *